(12) United States Patent
Monserratt

(10) Patent No.: US 6,247,883 B1
(45) Date of Patent: Jun. 19, 2001

(54) HIGH STRENGTH BLIND BOLT WITH UNIFORM HIGH CLAMP OVER AN EXTENDED GRIP RANGE

(75) Inventor: Ernest Monserratt, Long Beach, CA (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 09/352,128

(22) Filed: Jul. 13, 1999

(51) Int. Cl.[7] .............................. F16B 13/04; F16B 13/06
(52) U.S. Cl. ................................. 411/34; 411/43; 411/69
(58) Field of Search .................................. 411/34–38, 43, 411/55, 69, 70

(56) References Cited

U.S. PATENT DOCUMENTS

| | | |
|---|---|---|
| 3,613,496 | 10/1971 | Triplett . |
| 3,653,294 | 4/1972 | Nason . |
| 3,657,955 | 4/1972 | McKay . |
| 4,293,259 | 10/1981 | Liebig . |
| 4,778,318 | 10/1988 | Jeal . |
| 4,784,551 * | 11/1988 | Kendall ................................. 411/43 |
| 4,826,372 * | 5/1989 | Kendall ................................. 411/43 |
| 4,967,463 | 11/1990 | Pratt . |
| 4,968,198 | 11/1990 | Binns . |
| 5,066,179 | 11/1991 | Pratt . |
| 5,123,792 | 6/1992 | Strobel . |
| 5,178,502 | 1/1993 | Sadri . |
| 5,213,460 | 5/1993 | Sadri et al. . |
| 5,238,342 | 8/1993 | Stencel . |
| 5,350,264 | 9/1994 | Stencel . |
| 5,498,110 | 3/1996 | Stencel et al. . |
| 5,603,592 | 2/1997 | Sadri et al. . |
| 5,634,751 | 6/1997 | Stencel et al. . |
| 5,675,619 | 10/1997 | Erbes et al. . |
| 5,707,190 | 1/1998 | Hiraguri et al. . |
| 5,816,761 | 10/1998 | Cassatt et al. . |
| 5,947,667 | 9/1999 | Cassatt et al. . |

* cited by examiner

Primary Examiner—Neill Wilson
(74) Attorney, Agent, or Firm—Harness, Dickey & Pierce P.L.C.

(57) ABSTRACT

A blind bolt for securing a plurality of workpieces at a desired clamping force includes a pin having an elongated shank terminating at one end in an enlarged pin head and a generally elongated tubular sleeve adapted to receive said pin shank. The sleeve includes a first portion adapted to be located in aligned openings in the workpieces and a second portion being located on said pin shank between said pin head and said first sleeve portion. A nut is operatively connected with said pin and is adapted to be engaged by an installation tool whereby an axial force can be applied by the installation tool between said pin and the nut to clamp the workpieces together. The second sleeve portion is radially deformable at a location between said pin head and a blind side surface of the workpieces in response to the relative axial force of a magnitude less than the clamping force to form an enlarged blind head for engaging the blind side surface. A shear washer is positioned between the nut and the sleeve for transmitting the relative axial force to the second sleeve portion through said first sleeve portion and is adapted to shear after formation of the enlarged blind head to allow the blind head to engage the blind side surface such that further engagement of the nut with the pin will cause the fastener to clamp the workpieces between the nut and the blind head.

35 Claims, 10 Drawing Sheets

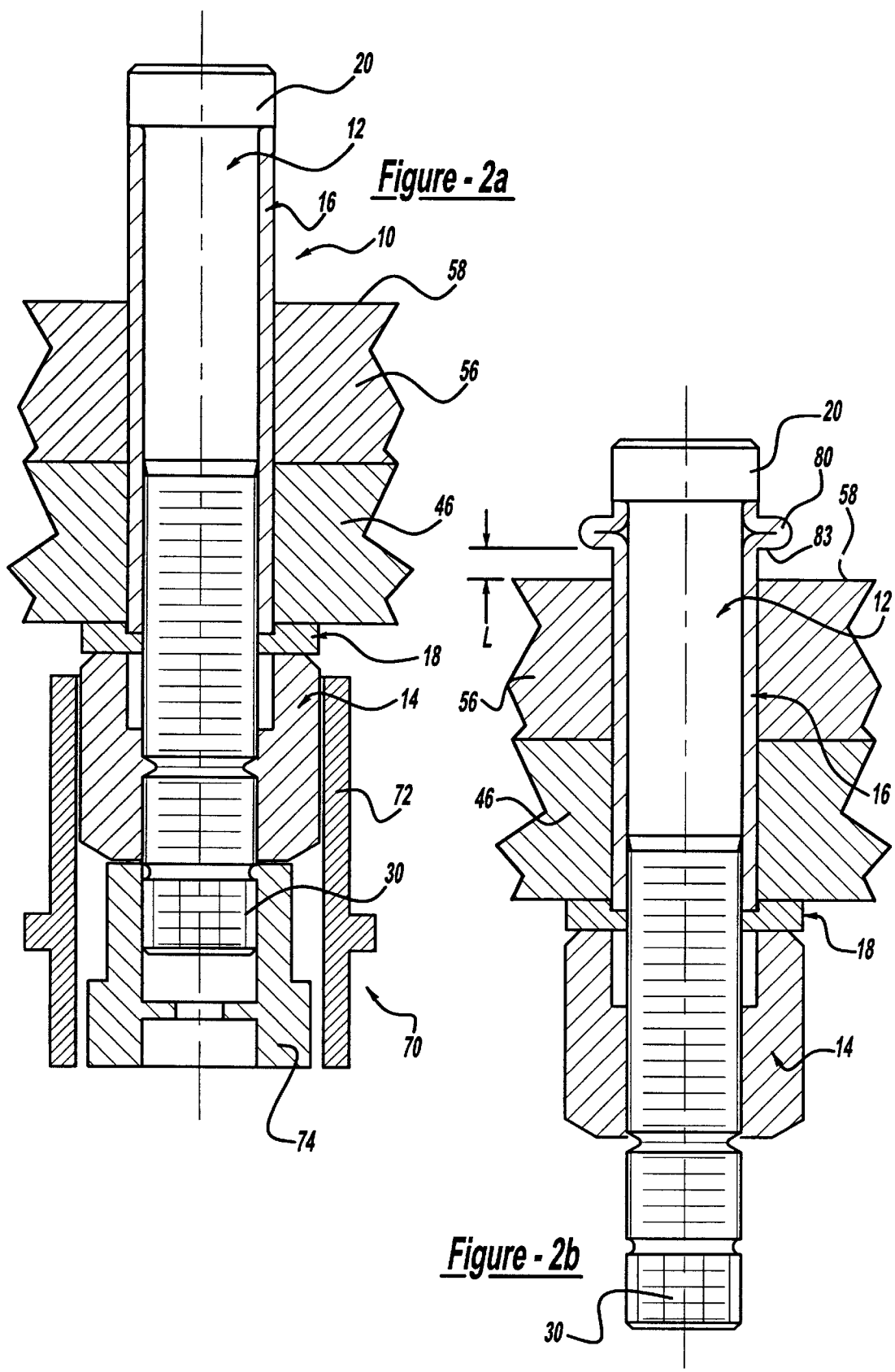

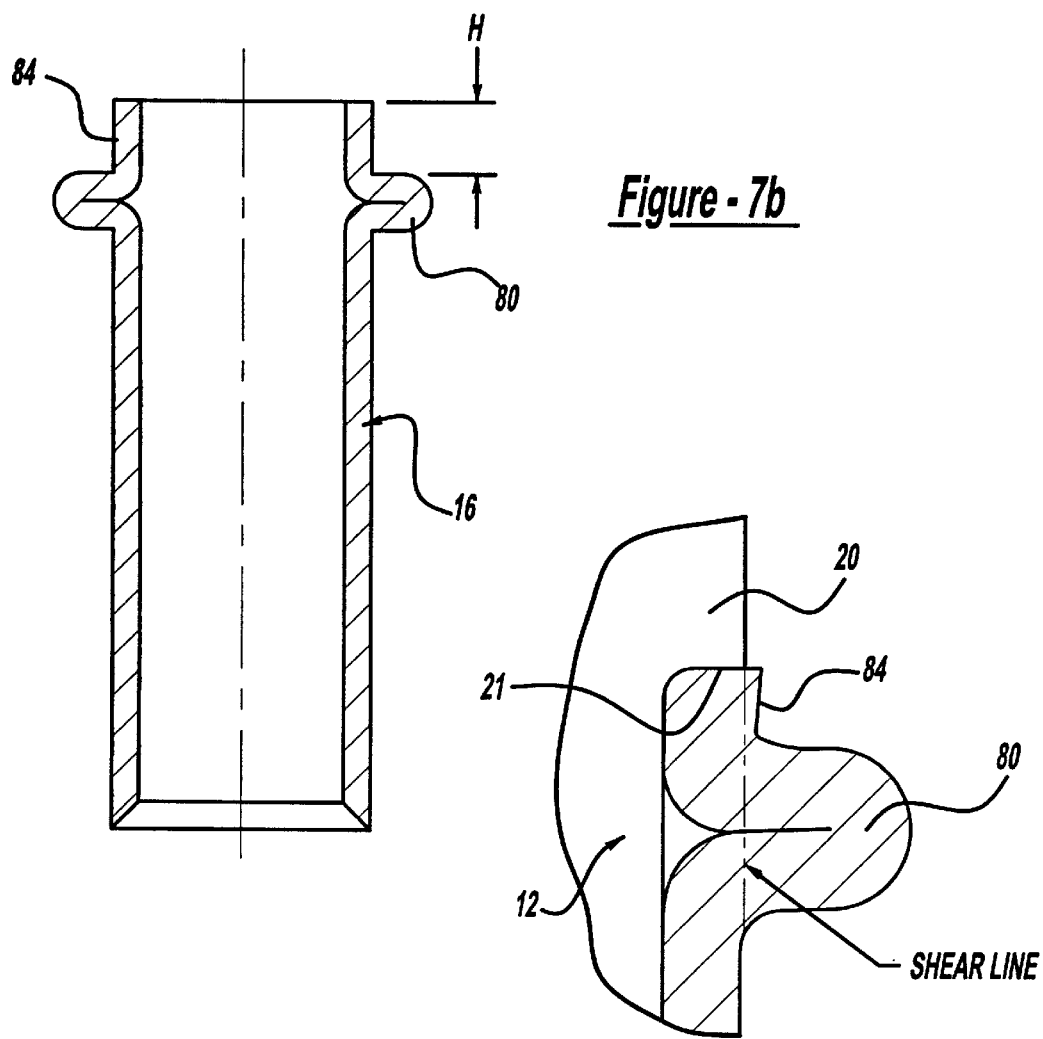
*Figure - 7b*
*Figure - 8a*
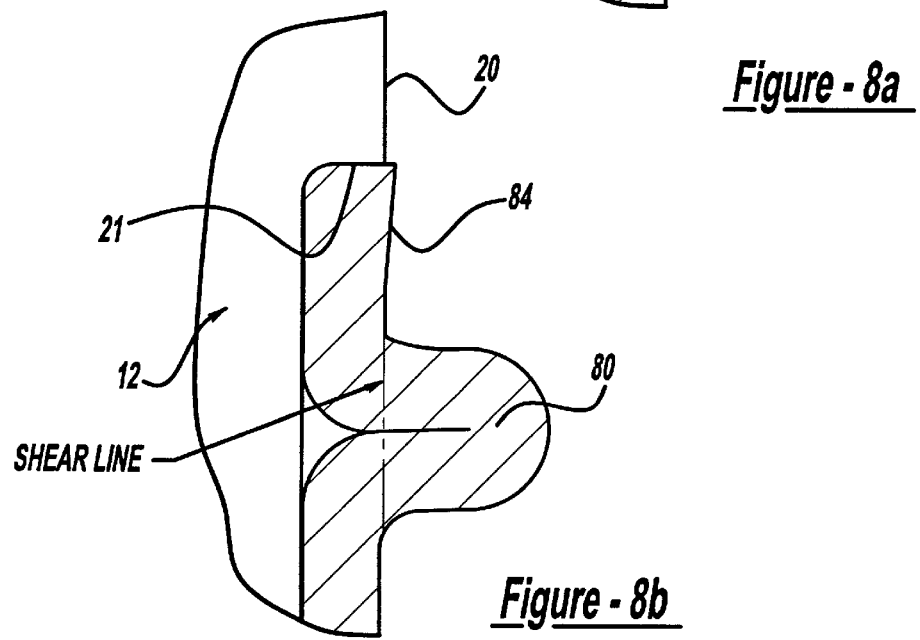
*Figure - 8b*

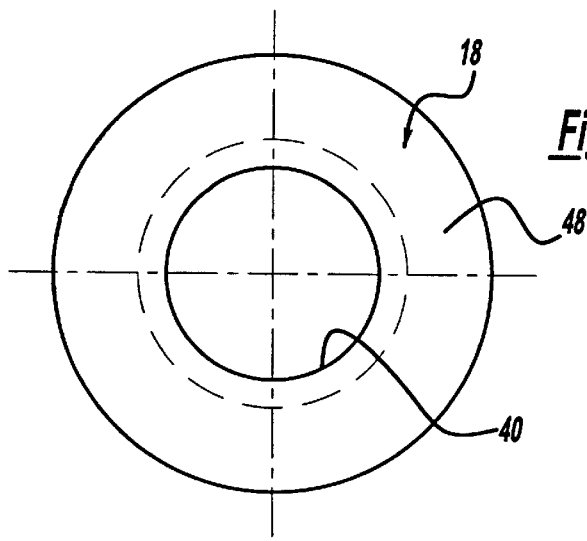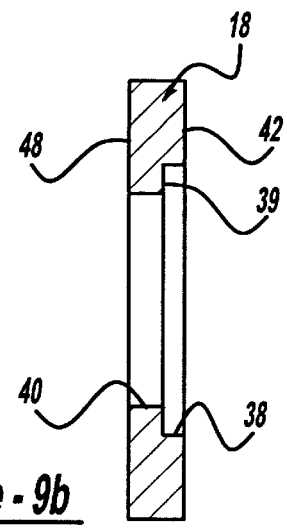
*Figure - 9a*
*Figure - 9b*
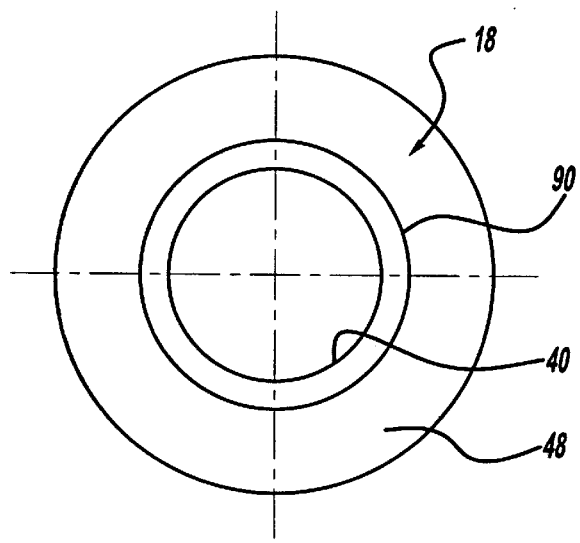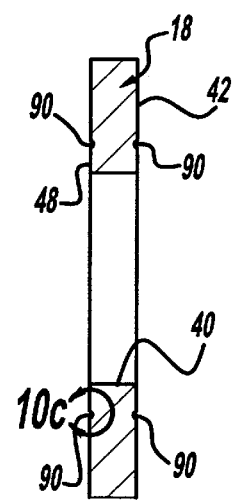
*Figure - 10a*
*Figure - 10b*
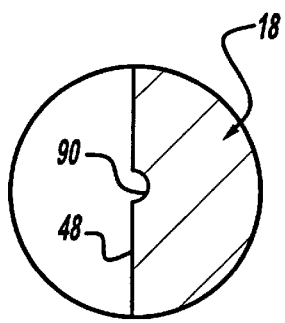
*Figure - 10c*

HIGH STRENGTH BLIND BOLT WITH UNIFORM HIGH CLAMP OVER AN EXTENDED GRIP RANGE

BACKGROUND OF THE INVENTION

1. Field of the Invention

The present invention relates to multi-piece fasteners and more particularly to a high strength blind bolt of the threaded torque type or the pull type using a swaged construction and providing a high final clamp load of workpieces secured together. Such blind fasteners, while of general utility, can be particularly useful in constructions utilizing closed sections such as box beams or columns, bridges and the like and more particularly in applications where accessibility on one side of the workpiece is blocked or limited.

2. Description of the Related Art

The fastener of the present invention also relates generally to multi-piece blind bolt fasteners which include a main sleeve, an expandable sleeve and a pin wherein the expandable sleeve is expanded radially to form a blind head in response to a relative axial force applied via the pin. In this regard, the blind bolt of the present invention is related to U.S. Pat. Nos. 5,603,592, issued Feb. 18, 1997 for High Strength Blind Bolt With Uniform High Clamp Range Over An Extended Grip Range ("the '592 patent"); 5,178,502, issued Jan. 12, 1993 for High Strength Blind Bolt ("the '502 patent"); and 5,213,460, issued May 25, 1993 for High Strength Blind Bolt With Uniform High Clamp Over An Extended Grip Range ("the '460 patent"), each of which is incorporated by reference herein. In U.S. Pat. No. 5,603,592, a blind bolt construction is disclosed utilizing a tension controlled type threaded nut and core pin construction. A nut member is threadably engaged on a threaded portion of the shank of the pin. A splined portion is located at the terminal end of the pin shank. An installation tool having a central socket member adapted to engage the splined portion and an outer wrench member adapted to grip the nut is used to apply torque between the core bolt or pin and the nut to provide relative rotation by which the nut is threaded onto the pin to attain the desired clamp up. A pair of sleeves, an expandable sleeve and a main sleeve, located on the pin cooperate to form a blind head in response to the applied torque.

As a result of the applied torque between the nut and the pin, the nut initially transmits an axial force to the main sleeve via a grip adjuster. At the same time, the pin has an enlarged head which transmits an opposite axial force against the expandable sleeve. As the torque and resultant relative axial force increases, the expandable sleeve, reacting against the main sleeve, is radially expanded to form a blind head. A blind head of uniform shape is provided over the extended grip range of the fastener.

At this stage of the installation, the workpieces have not been subjected to any clamp loads between the nut and grip adjuster and the blind head via the pin. In order to bring the blind head into engagement with the blind side surface, the grip adjuster is provided with a frangible, resistance or shear member which is in blocking communication with a cavity. The frangible shear or resistance structure is adapted to fracture at a preselected magnitude of relative axial force whereby the cavity which is no longer blocked is now accessible permitting axial movement of the main sleeve away from or out of load bearing relationship with the expandable sleeve; this permits the fully formed blind head to be brought into contact with the blind side surface of the workpieces with no axial restraint from the main sleeve which has moved substantially freely out of load bearing engagement with the expandable sleeve. Now the workpieces are pulled together by the further application of torque with the resultant relative axial force acting substantially solely between the blind head through the pin and the nut. The force clamping the workpieces together continues to increase until a magnitude of torque is attained at which a splined, pintail portion on the core bolt or pin is fractured from the pin. This fracture load determines the final clamp load on the workpieces.

This structure provides a wide grip range capability, in which a high strength blind head of a uniform structure is formed over this wide grip range. The blind head of uniform structure has the same blind side protrusion over the grip range. In addition, the blind bolt construction provides a structure in which high strength materials can be used resulting in a high strength fastener while at the same time achieving a high, uniform clamp force.

However, the fastener requires two sleeves to operate. The expandable bulb sleeve is made of a relatively soft steel capable of bulbing at low loads and also capable of forming around the head of the pin. The main sleeve is made of a hardened steel capable of acting as a punch to shear the shear member.

The '592 patent discloses that a one-piece sleeve may be used (see col. 10, lines 40–42) but does not describe such an embodiment. Similarly, the '460 patent discloses that a one-piece sleeve may be used (see col. 16, lines 13–15) but does not describe such an embodiment. Thus, given the different requirements for the two sleeves (the main sleeve must be hardened to shear the shear member, the expandable sleeve must be soft enough to bulb and form a blind head), both patents disclose manufacturing the main sleeve and the expandable sleeve from different steels, each having a different hardness. Neither the '592 nor the '460 patent discloses how to make a one-piece sleeve from a single type of steel meeting all of the requirements of the two types of sleeves it would replace.

SUMMARY OF THE INVENTION

The present invention is an improvement over the design of the fastener disclosed in the '592 patent. The blind fastener has a pin with an enlarged head portion, a shank portion and a gripping portion. A single sleeve is provided between the enlarged head portion and the frangible member and nut. Since only a single sleeve is utilized, the single sleeve is optimized to have a portion which will bulb properly under the desired parameters while still possessing sufficient strength and hardness to pierce the frangible member after formation of the bulb and allow clamping of the workpieces.

In the preferred embodiment, the fastener has been designed to have strength properties at or above the strength properties of the fastener disclosed in the '592 patent despite having a smaller overall fastener diameter and fewer components. The fewer number of components used in the fastener of the present invention reduce the cost of manufacture and assembly of the fastener as compared to the fastener of the '592 patent.

In one form of the invention, the single sleeve is of a generally straight tubular construction of generally uniform cross-section, i.e. without any significant change of cross section along its length, and the blind head is formed, through column loading, by bulbing a portion of the expandable sleeve which is located beyond the blind side of the workpieces. Formation of the blind head at a preselected location is facilitated by annealing a circular band on the expandable sleeve at the desired location. The bulbed blind head provides an enlarged bearing surface and hence is especially useful in applications in which the workpiece openings are substantially larger than the effective diameter of the fastener.

While features of the present invention are shown in conjunction with a threaded fastener, it can be understood from U.S. Pat. No. 5,213,460, that certain of these features can be applied to pull type and swage type fasteners. At the same time, features of the present invention can be utilized with fasteners having the blind head formed by radial expansion of an expandable sleeve by a tapered nose portion on a main sleeve member, see U.S. Pat. Nos. 5,178,502 and 5,213,460.

Thus, the high strength blind bolt of the present invention is readily adaptable for use in applications utilizing high strength bolts, such as those meeting ASTM A325 or Japanese F8T specifications. It is also desirable for use where blind welding, nut plates and other complex construction fastening systems are used in such structural elements such as box beams where there is no access to the backside of the joint. In this regard, the blind fastener of the present invention is especially suited in the construction of buildings, bridges, and the like where high strength and durability are of considerable importance along with the capability of providing high clamp loads.

As will be seen, the grip adjuster can be of a relatively simple construction and can be made of a high strength material whereby the strength of the frangible resistance or shear portion can be set at a high level. In this regard, this relatively simple construction readily allows the load for shearing the frangible resistance portion to be set at a level high enough to guarantee formation of the blind head and low enough to fracture before attainment of the final torque load for final clamp and fracture of the breakneck.

Thus, it is an object of the present invention to provide a unique blind bolt construction facilitating the use of high strength materials resulting in a high strength fastener having a wide grip range.

It is another object of the present invention to provide a blind bolt construction including a unique grip adjuster for providing a wide grip range.

It is another general object of the present invention to provide a unique high strength blind bolt of a construction that forms a high strength blind head having a uniform, desired configuration over a wide grip range.

It is still another general object of the present invention to provide a unique high strength blind bolt which provides a high final clamp load.

It is another general object of the present invention to provide a unique high strength blind bolt utilizing a tension control type threaded construction and providing a generally uniform final clamp load over a wide grip range.

It is another general object of the present invention to provide a unique high strength blind bolt having fewer components than known designs.

It is another general object of the present invention to provide a unique high strength blind bolt having a reduced overall diameter that provides equal or superior strength characteristics to known designs.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification, wherein like reference numerals designate corresponding parts in the various figures.

BRIEF DESCRIPTION OF THE DRAWINGS

FIGS. 2a–e show an installation sequence for the fastener of the present invention, with some portions shown in section and some portions shown schematically;

FIG. 7b is a sectional view of an alternative embodiment of a sleeve of the fastener of the present invention;

FIG. 8a is a partial view of the fastener of the present invention utilizing the sleeve of FIG. 7a, after bulbing of the sleeve;

FIG. 8b is a partial view of the fastener of the present invention utilizing the sleeve of FIG. 7b, after bulbing of the sleeve;

FIG. 9a is an end view of one embodiment of a shear washer of the fastener of the present invention;

FIG. 9b is a section view of the shear washer shown in FIG. 9a;

FIG. 10a is an end view of an alternative embodiment of a shear washer of the fastener of the present invention;

FIG. 10b is a section view of the shear washer shown in FIG. 10a taken in the Circle 10c in FIG. 10b;

FIG. 10c is an enlarged view of a portion of FIG. 10b;

DETAILED DESCRIPTION OF THE INVENTION

Figure 1:
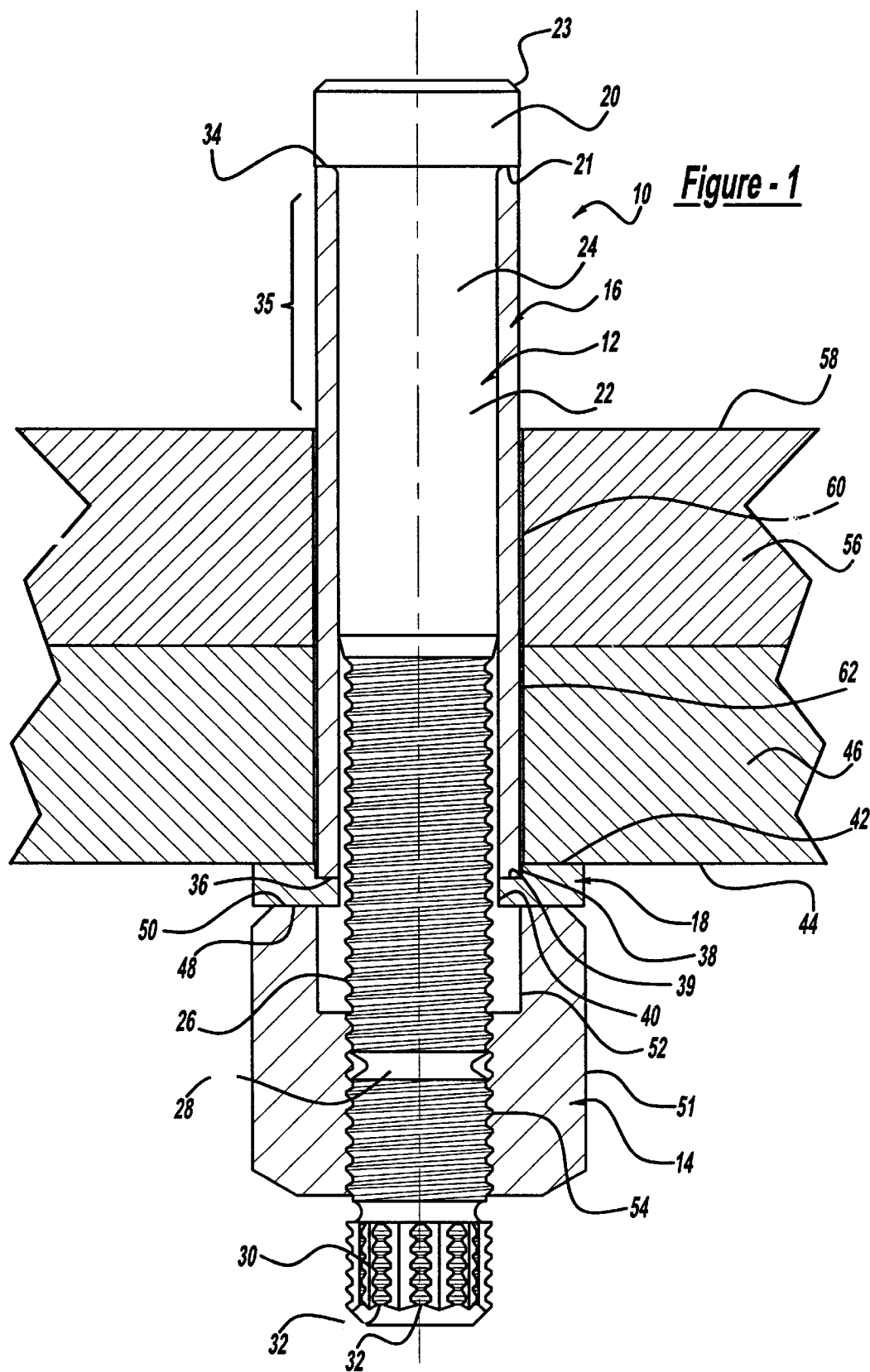
FIG. 1 is a side elevational view, with some portions shown in section, of the fastener of the present invention in assembly relationship with workpieces to be secured together.

As can be seen in FIG. 1, a blind fastener 10 includes a core bolt or pin 12, an annular nut 14, an expandable tubular sleeve 16 and a shear washer 18. The pin 12 has an enlarged head 20 having a sleeve engaging surface 21 and a tapered outer edge 23 for ease of insertion into a bore. The pin 12 also has an elongated shank 22 having a smooth shank portion 24, a threaded portion 26, a breakneck groove 28 and a pintail gripping portion 30 for gripping by an installation tool (see FIG. 2a). The breakneck groove 28 has a reduced cross-sectional area that is designed to fracture at a predetermined torque load at the conclusion of the installation cycle. The pintail gripping portion 30 includes a plurality of axially extending splines 32 and in one form of the invention, includes a generally conventional twelve spline construction. The gripping portion 30 also includes an overlying thread of the same size as threaded portion 26 for engaging nut 14 as nut 14 is screwed onto the pin 12.

The expandable tubular sleeve 16 is of a generally uniform tubular shape having generally uniform inside and outside diameters. The outside diameter is substantially the same as or slightly smaller than an outer diameter of the pin head 20. The inside diameter of the tubular sleeve is selected to allow the tubular sleeve to slide over the pin shank 22 and provide a desired tolerance between the tubular sleeve 16 and the smooth shank portion 24. The tubular sleeve 16 includes an end surface 34 for engaging the surface 21 of pin head 20 and an end surface 36 for engaging shear washer 18. The tubular sleeve 16 is constructed of a hardened steel but includes a portion 35 that has been annealed to allow for and facilitate bulbing of the sleeve 16 upon installation of the fastener 10.

In the presently preferred embodiment, as best seen in FIGS. 1, 9a and 9b, shear washer 18 includes a counterbore 38 having an end surface 39 for engaging end surface 36 of sleeve 16, a through bore 40 for allowing pin 12 to pass through, an end surface 42 for engaging an exposed surface 44 of workpiece 46 and an end surface 48 for engaging an end surface 50 of nut 14. A second workpiece 56 has a blind surface 58 and a bore 60 aligned with a bore 62 in workpiece 46.

Nut 14 has an outer surface 51 having a standard hexagonal shape for engaging the installation tool and includes a counterbore 52 having an outer diameter sufficiently large to receive an end portion of tubular sleeve 16 upon shearing of the shear washer 18. The depth of the counterbore 52 is selected to define the effective grip range of the fastener. Nut 14 also includes a threaded bore 54 for threadably engaging gripping portion 30 and threaded portion 26 of elongated shank 22. Nut 14 can also be provided with alternative outer shapes, as desired, to engage alternative installation tool drives.

Shear washer 18 is provided with a preselected thickness beneath the counterbore 38 to define a shear section adapted to fracture at a preselected shear load relative to the periphery of the counterbore 52 resulting from the relative axial force between the pin 12, sleeve 16 and nut 14. The relatively close tolerances between the pin 12, sleeve 16, counterbore 38 and threaded bore 54 of nut 14 maintain the components in a generally coaxial relationship.

In use of the fastener 10, the sleeve 16 and pin shank 22 are adapted to be located in and extend through aligned bores 60 and 62 in workpieces 56 and 46, respectively, with the surface 42 of shear washer 18 engaging surface 44 of workpiece 46. In this regard, the surface 42 has a sufficiently large effective load bearing area to provide a desired distribution on the surface 44 of workpiece 46 of the installation loads of the fastener 10, as well as the operating loads on the workpieces 46 and 56 after installation of the fastener 10. In addition, the opposite load bearing surface 48 of shear washer 18 engages the load bearing surface 50 of nut 14 and provides a sufficiently large effective load bearing area to accommodate the installation and operating loads. The outside diameters of the pin head 20 and sleeve 16 are selected to fit through the aligned bores 60 and 62 in a desired clearance fit.

The fastener 10 is adapted to be set by torque applied between the pin 12 and nut 14 via the threaded engagement of nut 14 on the threaded portion 26 of pin 12. FIG. 2a shows the fastener 10 inserted in the workpieces 46 and 56 and engaged by an installation tool 70. Tool 70 is of a construction generally known in the art and hence only a portion of the tool 70 is shown and the specific details thereof have been omitted for purposes of simplicity. The outer surface 51 of nut 14 is adapted to be drivingly engaged by a tubular socket member 72 of installation tool 70 configured to matingly engage the outer shape of nut 14. The installation tool 70 includes an inner socket member 74 which is configured to matingly engage the splined gripping portion 30 of pin 12. In one form of the tool, the inner socket member 74 is resiliently biased axially forward to provide sufficient engagement with the gripping portion 30. The outer socket member 72 and the inner socket member 74 are adapted to be rotated relative to each other. Thus, to install the fastener 10, the tool 70 is applied to the outer end of the fastener 10 with the outer socket member 72 in engagement with the nut 14 and the inner socket member 74 in engagement with the gripping portion 30 of pin 12. When the tool is actuated, the outer socket member 74 is rotated relative to the inner socket member, whereby the nut 14 is threaded further onto the threaded portion 26 of pin 12.

There are two conventional variations of installation tool 70. In the first type, the inner socket member 74 and the outer socket member 72 can each move with respect to the installation tool, depending only on the relative torque required to turn either the pin or the nut. In this type of tool, at the beginning of the installation cycle, the inner socket member 74 can rotate while the outer socket member 72 can stay stationary, thus rotating the pin 12 relative to the stationary nut 14. As the components of the fastener 10 are brought into increased loading relationship with the workpieces 46 and 56, the outer socket member and nut 14 will usually rotate while the inner socket member 72 holds stationary.

In the other type of installation tool 70, the inner socket member 74 is always held stationary with respect to the tool and only the outer socket member 72 rotates with respect to the installation tool. Thus, with such a tool, the pin 12 is always held stationary and the nut 14 rotated.

In either event, as this occurs, the pin 12 moves axially relative to nut 14. At the same time, the resilient axial bias on the inner socket member 74 permits it to be moved axially rearwardly to thus accommodate the additional axial movement of the pin 12 relative to the tool 70. In this way, a relative axial force is developed between the pin 12 and the sleeve 16 by virtue of the torque applied by tool 70 between the pin 12 and nut 14.

At the same time, as the pin 12 begins to move axially via the relative rotation with the nut 14, the applied relative axial force thus increases the column loading on the sleeve 16 causing it to expand radially outwardly (or bulb) at the annealed portion 35 to fully define a blind head 80 of a bulbed configuration at a point spaced from the blind side surface 58 of workpiece 56. See FIG. 2b. In the presently preferred embodiment, the bulb is formed at approximately 50,000–53,000 pounds of axial force. As the relative axial force increases, the frangible shear washer 18 fractures across a shear section 82 at the counterbore beneath the sleeve 16. See FIG. 2c. In the presently preferred embodiment, the shear washer fractures at approximately 57,000–61,000 pounds of axial force. This permits the shear section 82 and the sleeve 16 to begin entering counterbore 52 in nut 14 and removes any substantive axial loading on the portion of the sleeve 16 beneath the bulbed blind head 80. The shear section 82 of the shear washer 18 is selected to be of sufficient strength to accept the magnitude of relative axial force required to substantially fully form the bulbed blind head 80 prior to shearing.

Figures 2C, 2D:
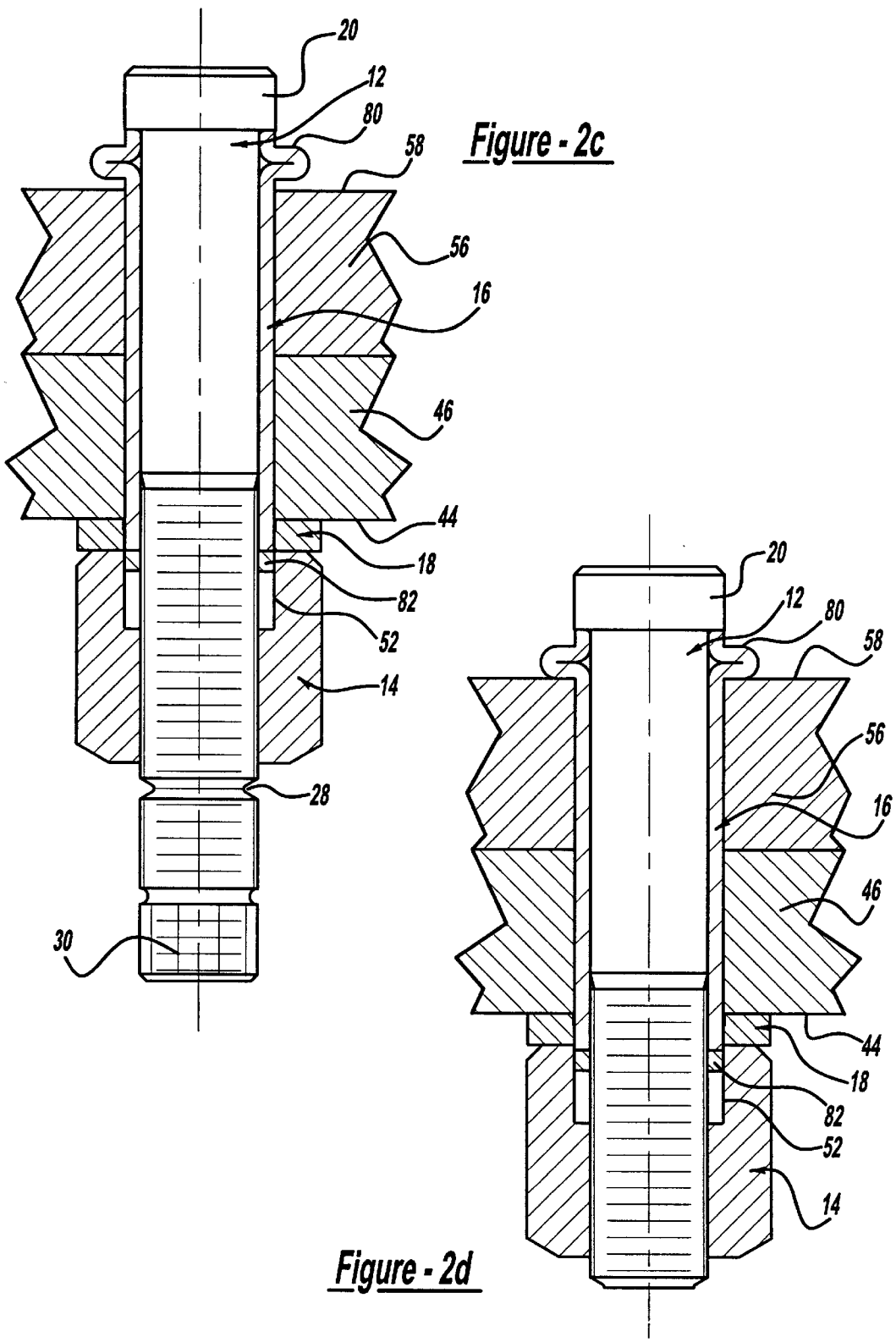
Figure 2E:
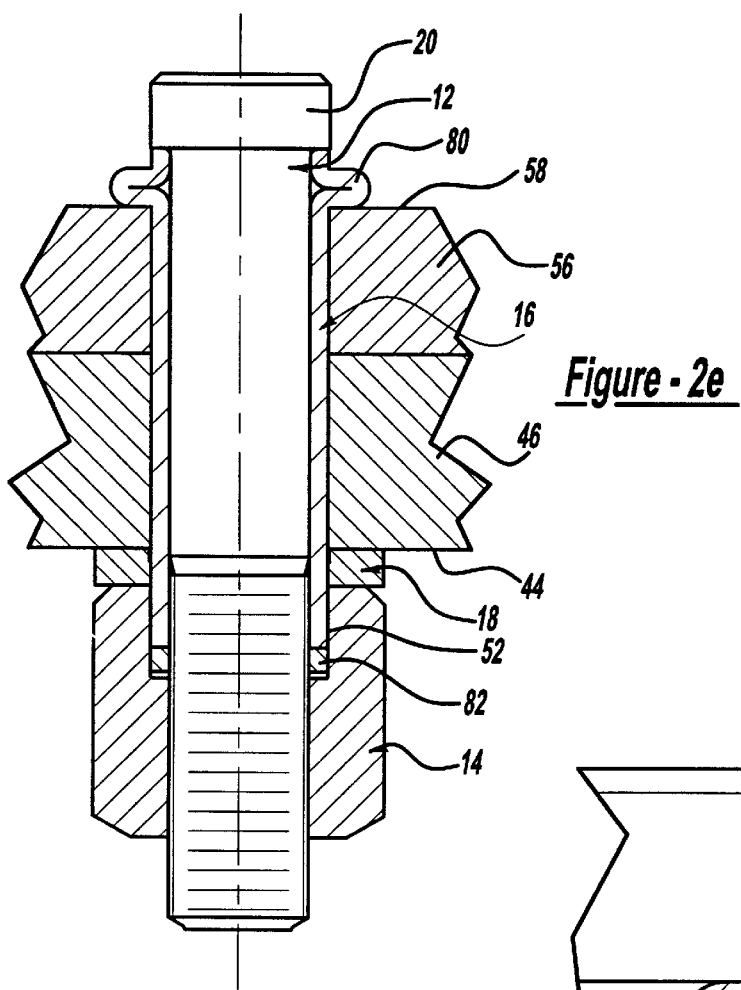

Continued rotation of the nut 14 relative to the pin 12 will continue axial movement of the pin 12 and sleeve 16, moving the blind head 80 into contact with the blind surface 58 of workpiece 56 and loading the fastener 10 with respect to the workpieces 46 and 56 until a desired clamping force is obtained. The desired clamping force will be determined by the force at which the breakneck groove 28 is designed to fracture, thereby limiting any further installation force from being applied to the fastener 10 by the installation tool 70. Application of the clamping force may also continue to slightly expand the bulbed blind head 80 prior to breaking of the breakneck groove 28. See FIGS. 2d and 2e which show the fastener 10 installed in the workpieces and loaded to the point of fracture of the breakneck groove 28, which in the presently preferred embodiment, occurs at approximately 66,000–71,000 pounds of axial force. FIG. 2d shows generally the maximum thickness of workpieces that the fastener 10 as depicted is designed to fasten. FIG. 2e shows generally the minimum thickness of workpieces that the fastener 10 as depicted is designed to fasten.

The range between the maximum and minimum thickness of workpieces that the fastener can accommodate is determined by the depth of the counterbore 52 into which the shear section 82 of shear washer 18 and the sleeve 16 can enter upon shearing of the shear section 82. The axial depth of counterbore 52 is selected to be greater than the distance L from a free end surface 83 of the blind head 80 of expandable sleeve 16 to the blind side surface 58 of workpiece 56 after the blind head 80 is fully formed as shown in FIG. 2b. The distance L can vary depending upon the total thickness of the workpieces being secured together. In a minimum grip condition, i.e. workpieces 46 and 56 of minimum total thickness, as seen in FIG. 2e, the distance L will be at its maximum and hence the counterbore 52 depth should be at least slightly greater than this maximum distance L to assure that the portion of sleeve 16 beneath blind head 80 is removed from load bearing engagement with pin 12 before the free end surface 83 of bulbed head 80 engages the blind side surface 58 under all grip conditions within the grip range of the fastener 10. This assures that the end surface 83 of bulbed head 80 will be freely moved into engagement with the blind side surface 58 of workpiece 56 as shown in FIGS. 2d and 2e. As thus, the full magnitude of the relative axial load resulting from the torque between the nut 14 and pin 12 is applied to the workpieces 46 and 56 substantially solely between the nut 14, washer 18 and the pin 12 via the pin head 20 and the bulbed head 80.

The number of threads of nut 14 engaged with the threaded pin shank portion 26 in full, final engagement is selected to be sufficient to provide the desired high level of clamp up of the workpieces 46 and 56 and to resist the maximum design tensile load on the resultant joint. Thus, the length of the threaded portion 54 of nut 14 is selected to be sufficient to provide the necessary number of threads to withstand these loads on full thread engagement (see FIG. 2d). At the same time, the length of the threaded pin shank portion 26 is selected to provide full thread engagement with the threads of nut 14 over the entire grip range of the fastener 10 while providing a minimum protruding length after installation. In this way, the overall length of the fastener 10 can be minimized in both the installed and uninstalled conditions.

In order to minimize the installation torque loads and thus assist in the proper functioning of the fastener components and the consistent, proper installation of the fastener, a high quality, baked on dry film lubricant such as molydisulphide has been found desirable on the pin 12 and surface 48 of the washer 18 to reduce friction between the moving parts of fastener 10. In practicality, although not preferred, lubricant can also deposit on the other surfaces of washer 18 during the lubricant application process. This additional lubricant can alternatively then be removed from all but surface 48. A molydisulphide lubricant such as Kalgard FA manufactured by Kalgard Corporation has been found to be satisfactory and is applied after a phosphate coating.

An electro-zinc corrosion resistant plating is desired on the nut 14 and a wax type lubricant such as paraffin is preferred on surface 50 of nut 14. The sleeve 16 is not lubricated and/or coated. When the shear washer 18 shears and the bulbed head 80 on sleeve 16 moves to the surface 58 of workpiece 56, the clamp load is developed between the workpieces 46 and 56 by rotation of the nut 14 relative to the pin 12 and against the stationary washer 18.

In some applications, in addition to the coating and/or plating applied to the pin 12, nut 14 and washer 18, it may be desirable to apply an anti-corrosion oil to the sleeve 16. One type of anti-corrosion oil can be an oil sold under the trade name LANACOTE by Amrep, Inc.

The effect of the angle of surface 21 relative to the pin 12 is shown in FIGS. 3–6. In prior art designs utilizing two sleeves, with the bulbing sleeve being relatively soft, the surface 21 was placed at a 12° angle above a plane perpendicular to an axis of the pin 12. This was done to guide the soft bulbing sleeve material around the pin head to form a tulip shaped bulb. However, in the fastener of the present invention, it has been found that such "tuliping" of the sleeve reduces the strength of the fastener 10. Therefore, it is desirable to prevent the relatively hard sleeve of the present fastener from moving up and forming around the pin head 20. It has also been found that undesirable clamping load variations can occur if the outer peripheral corner of surface 21 of pin head 20 is permanently deformed or even shears. Thus, the angle of surface 21 is more critical when combined with the harder sleeve of the present invention and has been designed to minimize the aforementioned shortcomings.

Figure 3B:
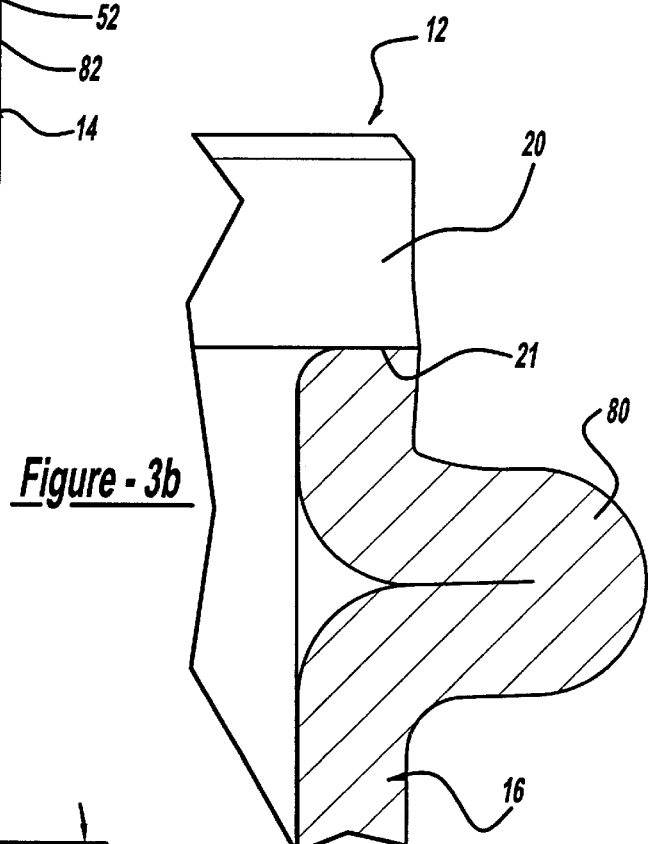
FIG. 3b is a pictorial representation of a photograph of an actual section of a portion of the fastener depicted in FIG. 3a after bulbing of the sleeve.
Figure 3A:
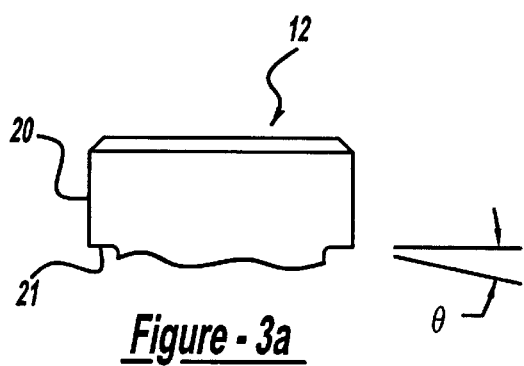
FIG. 3a is a partial view of the head of one embodiment of the pin of the fastener of the present invention.

The preferred angle has been found to be 1° below a plane perpendicular to an axis of the pin 12, as shown in FIG. 3a. In other words, this is an angle of 89° between the surface 21 and the elongated shank 22. This angle has shown to resist the tendency of the sleeve to ride up over the head 20, as well as minimizing swelling or shearing of the outer peripheral corner of surface 21 of pin head 20. actual photo of a section of a previously installed fastener of the present invention with a pin head having such an angle is shown in FIG. 3b. It can be seen from FIG. 3b that the sleeve has not ridden up over the pin head 20 and that swelling of the outer peripheral corner of surface 21 has been very slight. This embodiment has been shown to improve clamp load variation between multiple fasteners.

Figure 4A:
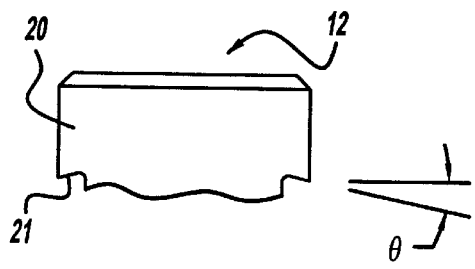
FIG. 4a is a partial view of the head of an alternative embodiment of the pin of the fastener of the present invention.
Figure 4B:
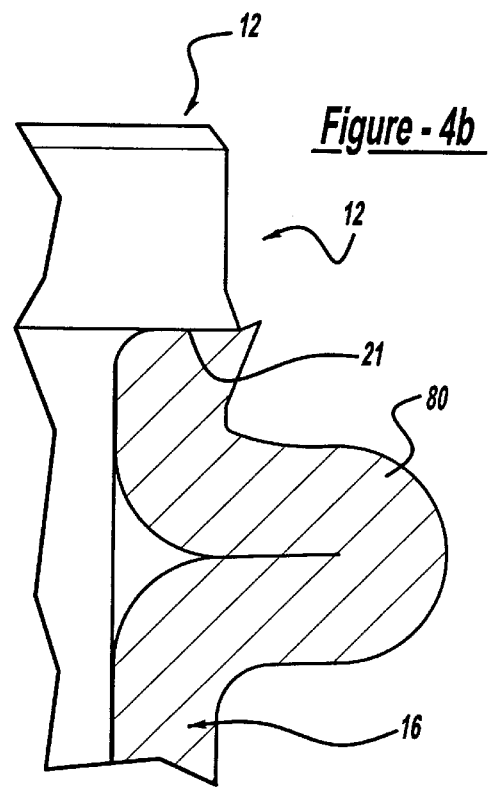
FIG. 4b is a pictorial representation of a photograph of an actual section of a portion of the fastener depicted in FIG. 4a after bulbing of the sleeve.

FIG. 4a shows an embodiment where surface 21 has been provided with an angle of 5° below a plane perpendicular to an axis of the pin 12. However, as can be seen in FIG. 4b, a pictorial representation of an an actual photo of a section of a previously installed fastener having a pin head with such an angle, this embodiment resulted in significant permanent deformation of the outer peripheral corner of surface 21, as well as significant outward permanent deformation of the sleeve 16 itself, sufficient to result in undesirable clamping load variations.

Figure 5B:
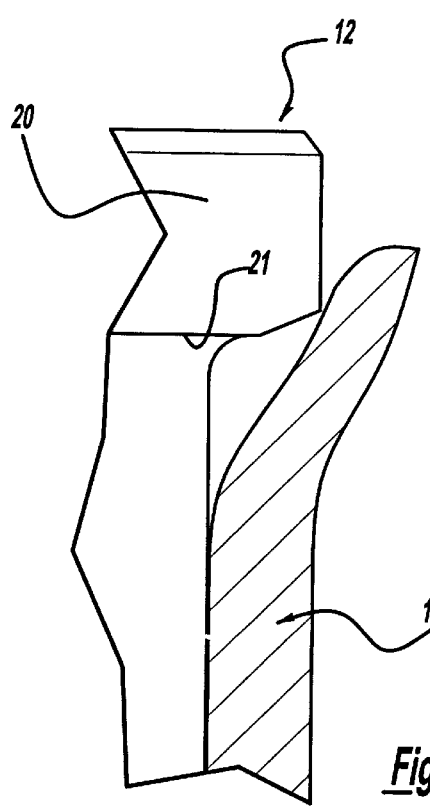
FIG. 5b is a pictorial representation of a photograph of an actual section of a portion of the fastener depicted in FIG. 5a after deformation of the sleeve.
Figure 5A:
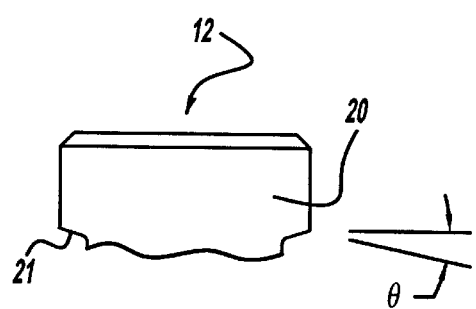
FIG. 5a is a partial view of the head of an alternative embodiment of the pin of the fastener of the present invention.

FIG. 5a shows an embodiment where surface 21 has been provided with an angle of 5° above a plane perpendicular to an axis of the pin 12. However, as can be seen in FIG. 5b, an actual photo of a section of a previously installed fastener having a pin head with such an angle, this embodiment resulted in the sleeve riding up over the pin head 20, thereby preventing proper clamp generation of the fastener.

Figure 6A:
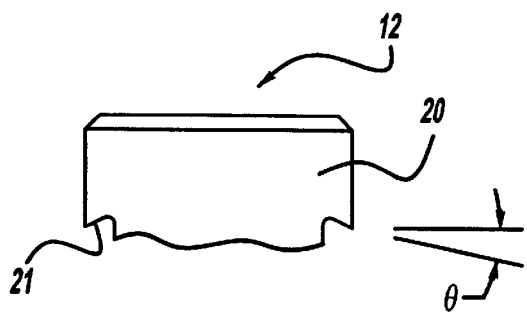
FIG. 6a is a partial view of the head of an alternative embodiment of the pin of the fastener of the present invention.
Figure 6B:
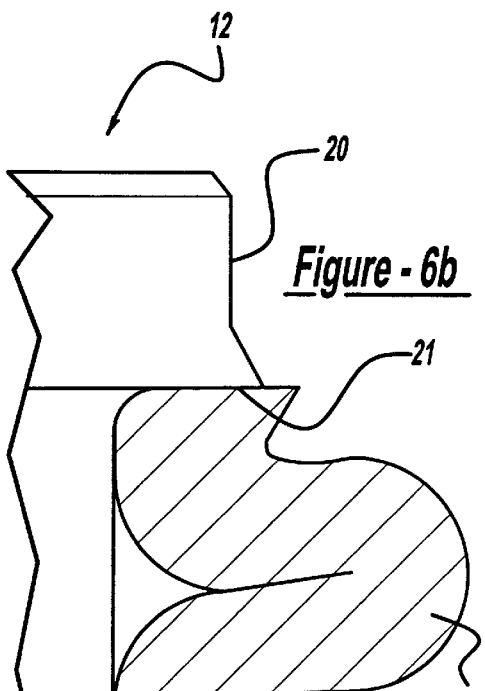
FIG. 6b is a photograph of an actual section of a portion of the fastener depicted in FIG. 6a after bulbing of the sleeve.

FIG. 6a shows an embodiment where surface 21 has been provided with an angle of 12° below a plane perpendicular to an axis of the pin 12. However, as can be seen in FIG. 12b, an actual photo of a section of a previously installed fastener having a pin head with such an angle, this embodiment resulted in severe permanent deformation and even shearing of the outer peripheral corner of surface 21, as well as severe outward permanent deformation of the sleeve 16 itself, and resulted in undesirable clamping load variations. This embodiment is similar to the pin head embodiment disclosed in the '592 patent.

Figure 7A:
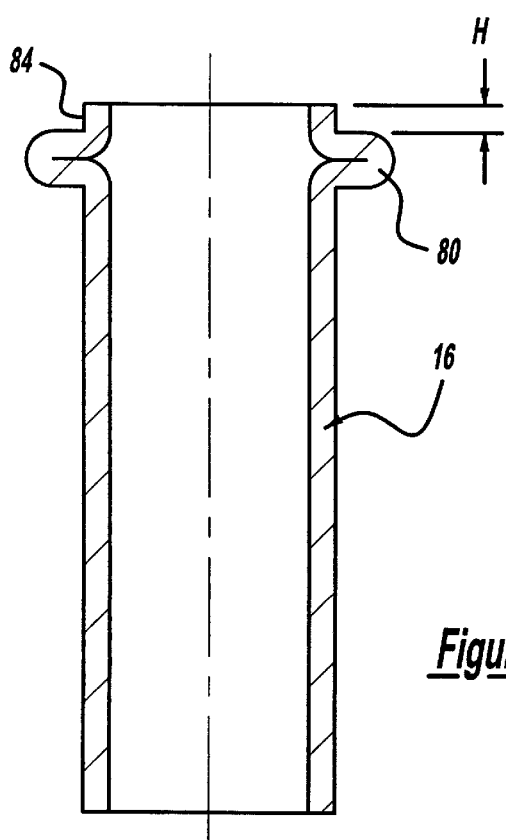
FIG. 7a is a sectional view of one embodiment of a sleeve of the fastener of the present invention.

The strength of the fastener 10 has also been found to vary depending on the height of the portion of the sleeve 16 above the blind head 80 and below the surface 21 of pin head 12. As can be seen in comparing FIGS. 7a and 7b, a height H of a leg 84 of the sleeve 16 above the blind head 80 can be varied depending on the axial placement of the annealed section 35 on sleeve 16. If the annealed section 35 is positioned higher on the sleeve 16, the blind head 80 will form higher on the sleeve, providing a leg 84 having a shorter height H, as seen in FIG. 7a. This height H can also be affected by the width of the band 28. On the other hand, if the annealed section 35 is positioned lower on the sleeve 16, the blind head 80 will form lower on the sleeve 16, providing a leg 84 having a greater height H.

FIGS. 8a and 8b show enlarged views of the sleeve 16 of FIGS. 7a and 7b, respectively, installed on pin 12. As can be seen in comparing FIGS. 8a and 8b, the sleeve 16 having a short leg 84 actually provides a longer shear line between the pin head 20 and workpiece 56 (not shown) than the sleeve 16 having the longer leg 84. This is a result of the slight outward swelling of the sleeve 16 at leg 84 upon installation of the fastener such that the shear line includes both the length of the blind head 80 and the length of leg 84. See also FIG. 3b.

There is a similar swelling of the top portion of leg 84 of the sleeve shown in FIGS. 7b and 8b, such that the top portion of leg 84 overlaps the shear line. However, since the swelling does not run the entire length of the leg 84, the length of the shear line is not increased in this embodiment to include the length of the leg 84 but only runs the length of the blind head 80. The length of the shear line increases only if the expansion of the leg is such that the shear line continuously overlaps both the blind head 80 and a portion of the leg 84, as shown in FIGS. 7a and 8a. If the overlapping is discontinuous, as shown in FIGS. 7b and 8b, the length of the shear line does not increase. Rather, the strength of the fastener will be based only on the length of the shear line through the blind head. Thus, the embodiment of FIGS. 7a and 8a provides a stronger fastener resulting from the longer shear line and is the preferred embodiment, while the embodiment of FIGS. 7b and 8b is more representative of the prior art, as seen in the '592 and '460 patents.

With the use of high strength, high hardness materials, it is desirable to reduce the stress concentrations such as that at the juncture between the inner surface 21 of the pin head 20 and smooth shank portion 24. This is accomplished by radiusing the juncture. In addition, chamfers are provided on the inside diameter at the opposite ends of sleeve 16 to prevent the sleeve from cutting into the radiused juncture. Other junctures and corners can be similarly radiused and chamfered.

In addition to the reduction of the stress concentrations, as noted, it is desirable to reduce stress concentrations between mating threads. Thus, the threads of the threaded shank portion are formed to be generally shallow in depth and to have roots of a generally streamlined contour. Thus, in one embodiment, the threads could utilize the groove shape and concepts of U.S. Pat. No. 5,090,852 issued Feb. 25, 1992 to Dixon. With this root construction, the stress concentration at the threads is also reduced.

As noted in the '852 Dixon patent, the threads can be of a shallow helical construction with a generally streamlined shape whereby a high strength joint construction can be achieved having a desirable high clamp load. With the noted shallow thread structure, a close tolerance fit with the threads of the nut 14 is desirable. In one form of the invention, tolerances similar to a Class 3 thread fit were utilized.

As noted, it is desirable that the high strength fastener of the present invention provide a high final clamp load to the fastened joint. To achieve this result, high installation loads including final pin break load at breakneck groove 28 are required from the installation tool 70. These loads, however, are applied by torque and hence are generally absorbed by the tool 70 and are essentially not transmitted to the operator handling the installation tool 70. Thus the high load occurring at pin break at breakneck groove 28 is substantially absorbed by the tool 70 by virtue of the torque application to the fastener 10. The magnitude of installation torque required by the installation tool 70 can be substantially reduced by use of the selective lubrication previously discussed such that the rotational speed of the final output of the tool 70 can be increased whereby the time required for installation can be significantly reduced.

An alternative embodiment of the shear washer can be seen in FIGS. 10a–c. Instead of having counterbore 38, the alternative embodiment washer shown in FIGS. 10a–c includes a circular groove 90 on each surface 42 and 48, concentric with bore 40. Each groove preferably has a semicircular cross-section, as seen in the enlarged view of FIG. 10c. The groove can also have different shapes, including a v-shape, and can have different shapes and depths as compared to one another. The two grooves 90 act as stress risers on the washer 18 to create a frangible section therebetween which will shear upon installation of the fastener. Alternatively, only a single groove 90 on one surface of the washer can also be provided. The force at which the shear washer fractures and shears can be varied as desired by altering the thickness of the washer, material from which the washer is constructed and the size, shape and location of stress riser forming structures.

The various features of the different shear washers disclosed can also be alternatively combined in different combinations to create alternative shear washer embodiments.

In many applications with threaded fasteners it is desirable, after installation, to be able to remove the fastener by unthreading the nut from the bolt or in some cases to retighten the joint by applying additional torque between the nut and bolt. In certain applications, however, the initial breakaway torque for removal can be quite high such that when applying a wrench only to the nut (such as nut 14) for removal or retightening, both the nut and associated pin or bolt will turn together making threaded removal or retightening somewhat difficult if not impossible. In the alternative embodiment of the present invention shown in FIG. 11, a construction is provided for permitting separate gripping of the pin and nut after installation of the fastener for the application of torque thereby facilitating removal or retightening.

Figure 11:
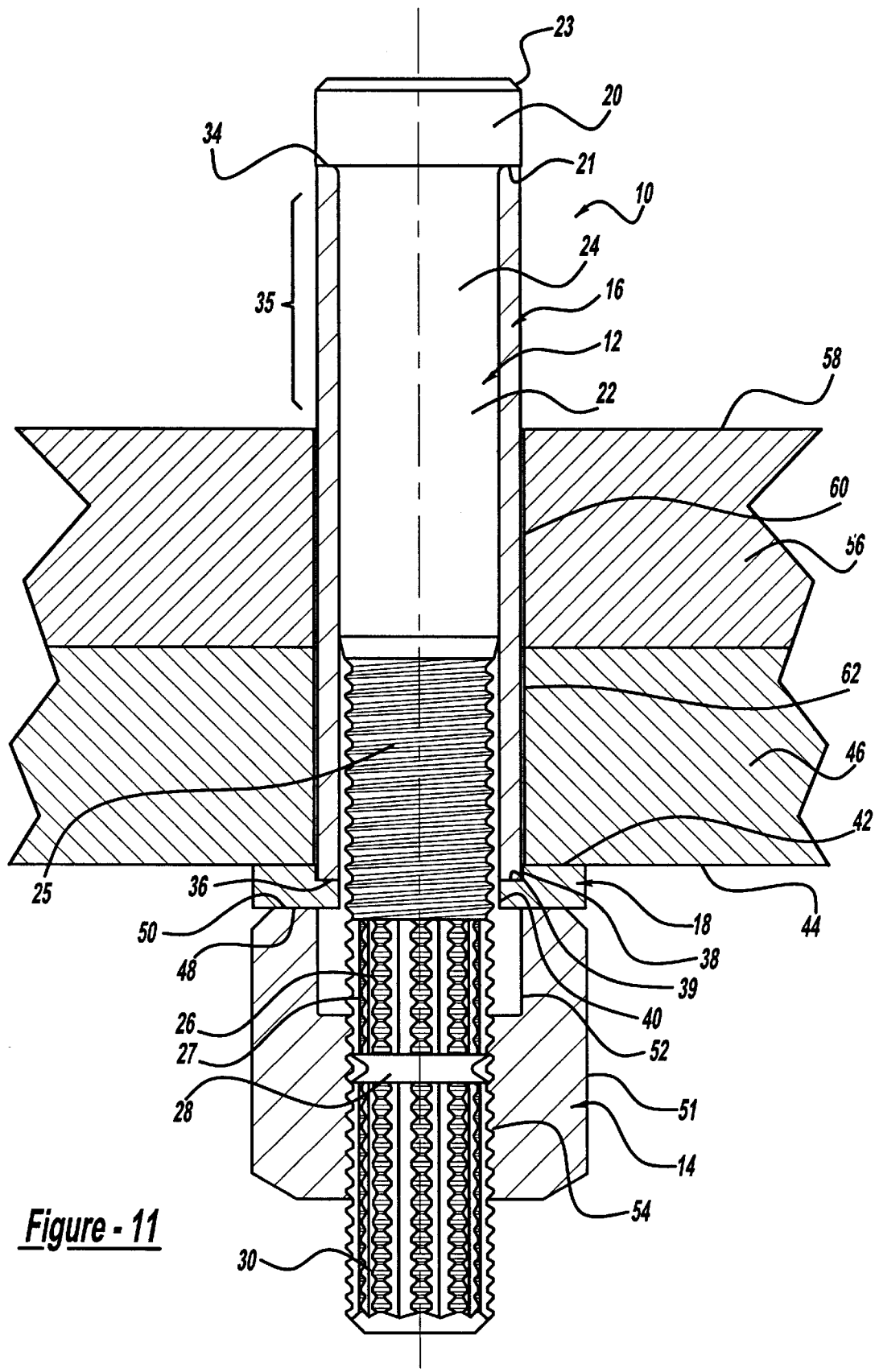
FIG. 11 is a side elevational view, with some portions shown in section, of an alternative embodiment of the fastener of the present invention in assembly relationship with workpieces to be secured together.

As can be seen from FIG. 11, the threaded portion 26 includes a secondary splined/threaded portion 27, similar to gripping portion 30, inwardly of the breakneck groove 28. Thus, upon final installation and removal of the splined pintail portion 30 by fracturing of the breakneck groove 28, the secondary splined portion 27 will remain at the free end of the pin 12. The other components of this fastener embodiment are the same as the embodiment shown in FIG. 1.

The secondary splined portion 27 is selected to be of sufficient length so that in the maximum grip condition it will extend past the outer end of the nut 14 far enough to be properly engaged by a grooved socket member (such as inner socket member 74 on tool 70). Nut 14 can also be engaged via a hexagonal socket member (such as hex socket member 72 on tool 70). Thus, the pin 12 is held relative to the nut 14 so that a removal or tightening torque can be applied between the pin 12 and the nut 14 (which component rotates will depend on the type of installation tool used, as discussed above). The minimum protrusion of the secondary splined portion 27 beyond the outer end of the nut 14 would occur in a maximum grip condition, i.e. workpieces 46 and 56 of a maximum total thickness within the grip range of fastener 10. At the same time, the maximum protrusion of the secondary splined portion 27 beyond the outer end of the nut 14 would occur in the minimum grip condition, i.e. workpieces 46 and 56 of a minimum total thickness within the grip range of fastener 10. It is desirable to maintain the protrusion to be as short as possible. This is done by first determining the length of secondary splined portion 27 required to provide sufficient engagement with a mating socket member to withstand the removal torque in a maximum grip condition. With this set as short as possible, the maximum protrusion of the secondary splined portion 27, in the minimum grip condition, would be a distance equal to the grip length plus the preselected length of protrusion determined adequate for the maximum grip condition.

In the preferred embodiment of the invention, the fastener 10 has the following specifications, with the dimensions given being approximate and subject to fluctuation within tolerance parameters. The pin 12 is made from 4140 steel and hardened to $R_c$ 36–38 after machining (or forming). The pin head 20 head has a diameter of 1.102" and a length of 0.475", the shank 22 has an overall length of 6.413", the smooth shank portion 24 has a diameter of 0.866" and a length of 2.80", the threaded portion 26 has a 0.876" outer diameter and is 2.9" in length, and the breakneck groove 28 has a root diameter of 0.610". The threaded portion 26 has a thread having a minor diameter of 0.816", a 0.0429" reference screw crest and a 0.125" pitch, as does the gripping portion 30, with the gripping portion 30 also having a 12 point drive spline having an outer diameter of 0.847".

Figure 12:
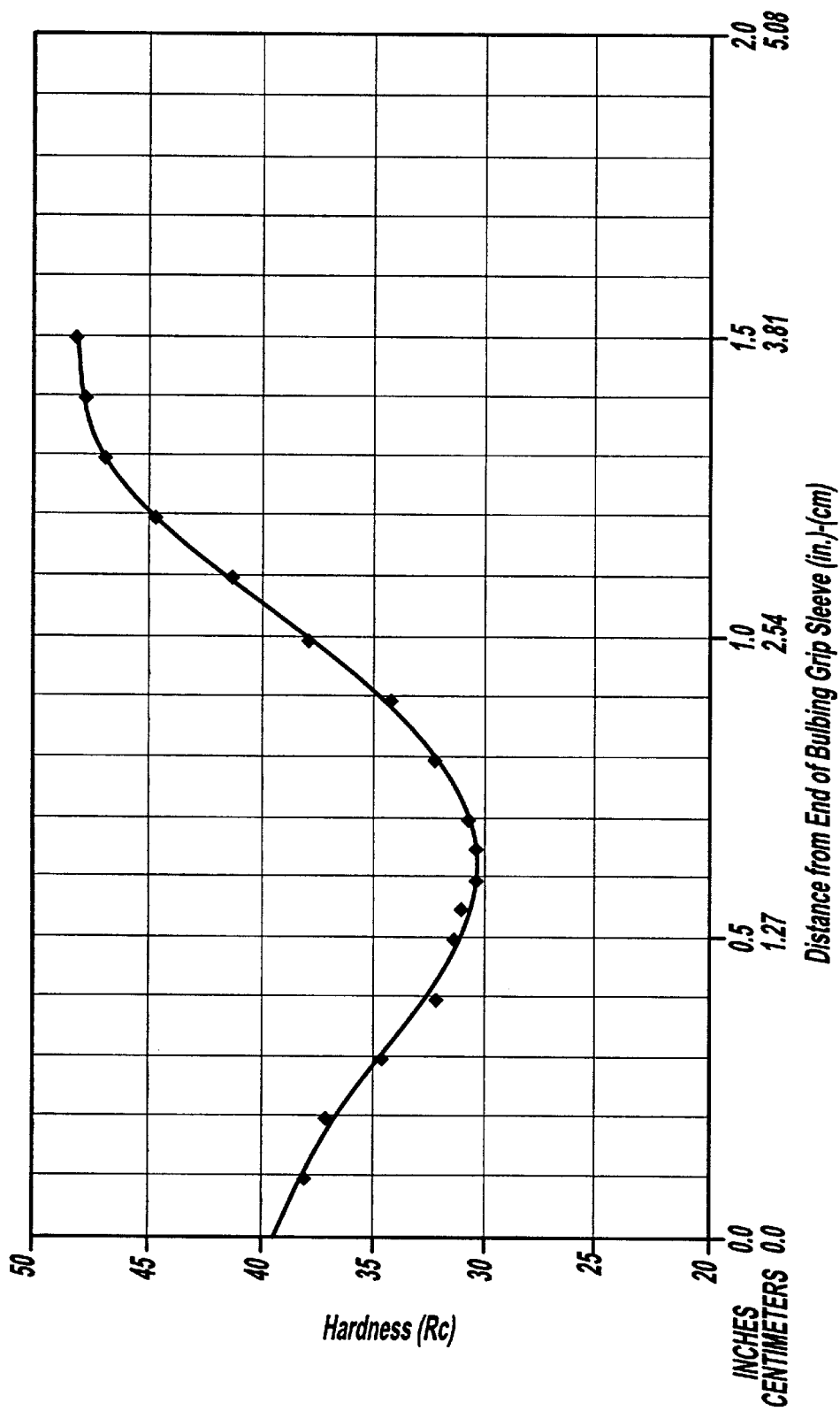
FIG. 12 is a typical hardness profile for the annealed band of the sleeve of the present invention.

The tubular sleeve 16 is made from 4130 steel and is hardened to $R_c$ 46–49 after processing. It has an outer diameter of 1.098", an inner diameter of 0.887" and a length of 3.927". The annealed band 35 is centered at approximately 0.600" from end surface 34 and has a typical hardness profile across its axial width as shown in FIG. 12. With this embodiment, the blind bulb will have a typical outer diameter of 1.650" and a height of 0.233" after installation and the leg 84 will be relatively short to provide the advantages as discussed in connection with FIGS. 7a and 8a, having a typical length of 0.090–0.130" after installation of the fastener. The outer diameter of the leg 84 will typically swell by 0.020–0.050" (or by about 1.8–4.5%) after installation as compared to the initial outer diameter. In this regard swelling could be between 1.5–5.0%. With this short leg 84 design, as depicted in FIGS. 7a and 8a, the fastener will typically have a failure load in excess of 93,000 pounds, as compared to the fastener design shown in FIGS. 7b and 8b, which will typically have a failure load of approximately 83,000 pounds. Thus, the short leg 84 design provides a significant increase in the failure load of the fastener.

Alternatively, the sleeve can be made from a suitable stainless steel for corrosion resistance. Although not preferred, the band section 35 can be provided not by annealing a portion of hard sleeve 16, but rather, by hardening the other portions of the sleeve with respect to band portion 35.

The shear washer 18 is made of 4140 steel and is hardened to $R_c$ 41–44 after machining (or forming). It has a thickness of 0.23", an outer diameter of 1.83", a counterbore 38 diameter of 1.130", a through bore 40 diameter of 0.887", and a thickness under the counterbore 38 (i.e., the shear section thickness) of 0.144".

The nut 14 is made from 4130 steel and hardened to $R_c$ 36–38 after machining (or forming). It has a width between opposing hexagonal faces of approximately 1.62", an overall height of 1.50", a counterbore 52 depth of 0.55" and diameter of 1.125", and a threaded bore 54 having a thread with a major diameter of 0.894", a minor diameter of 0.835" and configured to properly engage the threaded portion 26 of pin 12.

The grip range for the fastener is 8 mm±1 mm. It is intended for use in conventional nominal 27 mm applications wherein the bore is usually drilled with a 30 mm drill bit. Of course, the fastener can be provided in alternative sizes and grip ranges.

It should be noted that various features of the different embodiments can be interchanged to provide different embodiments. In addition with each of the embodiments shown, it can be seen that for fasteners of the same diameter for use in different grip ranges literally only the pin and sleeve need be changed to accommodate the required changes in length of the fasteners. This feature simplifies the manufacture and inventory requirements of the fastener components.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head, said pin head including a sleeve engaging surface on an underside thereof, an angle between said sleeve engaging surface and said elongated pin shank being between approximately 88–90°;

a generally elongated tubular sleeve adapted to receive said pin shank, said tubular sleeve including a first sleeve shank portion adapted to be located in the aligned openings in the workpieces and a second sleeve shank portion being located on said pin shank between said pin head and said first sleeve shank portion and arranged to engage said sleeve engaging surface of said pin head, said second sleeve shank portion having a band portion of a predetermined axial length, said band portion having a hardness less than the hardness of the first sleeve shank portion;

engaging means operatively connected with said tubular sleeve and including an engaging structure adapted to be engaged by the installation tool whereby the relative axial force can be applied by the installation tool between said pin member and said engaging means to clamp the workpieces together at a relative axial force of a first magnitude;

said second sleeve shank portion being radially deformable at said band portion between said pin head and the blind side surface of the workpieces in response to the relative axial force of a second magnitude less than said first magnitude to form an enlarged bulbed blind head for reacting against the blind side surface and a sleeve leg section extending between said blind head and said sleeve engaging surface for a preselected length;

a load bearing means for transmitting the relative axial force of said second magnitude to said second sleeve shank portion through said first sleeve shank portion and responsive to a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means;

said load bearing means adapted to be located generally externally of the aligned openings at the accessible side surface of the workpieces; securing means on said pin shank;

said engaging means including an engaging structure operable with said securing means for connecting said pin member and said engaging structure together; and wherein said sleeve leg section expands radially outwardly upon application of the relative axial forces, said preselected length of said sleeve leg section being such that said sleeve leg section expands sufficiently to increase the length of a shear line through said blind head between the workpieces and said pin head to continuously include said preselected length of said sleeve leg section.

2. The blind bolt of claim 1 with said load bearing means comprising a load bearing member having one side adapted to be in load bearing relationship with the accessible side surface of the workpieces.

3. The blind bolt of claim 1 with said securing means including securing grooves on said pin shank being defined by a helical thread form, said engaging structure having a mating thread form adapted to be threadably engaged with said securing grooves whereby the relative axial force between said pin member and said engaging means is provided by the relative torque applied between said pin member and said engaging structure.

4. The blind bolt of claim 1 with said securing means including securing grooves on said pin shank being defined by a helical thread form, said engaging structure being a nut member having a mating thread form adapted to be threadably engaged with said securing grooves whereby the relative axial force between said pin member and said nut member is provided by the relative torque applied between said pin member and said nut member, said pin shank having a splined end portion adapted to be engaged by the installation tool whereby torque can be applied between said pin member and said nut member, said splined end portion having a plurality of axially extending pointed splines defined by ridges extending radially from spline roots, said splines being generally uniformly circumferentially distributed with a plurality of said splines located in each quadrant around said end portion, said helical thread form extending across said splined end portion with the major and minor diameters of said spline ridges and roots being substantially the same as and compatible with the major and minor diameters of said helical thread form of said threaded portion whereby said nut member can be threaded thereacross.

5. The blind bolt of claim 1, wherein a section of said band portion has a hardness between $R_c 28-35$.

6. The blind bolt of claim 1, wherein the angle between said sleeve engaging surface and said elongated pin shank is approximately 89°.

7. The blind bolt of claim 6, wherein a section of said band portion has a hardness between $R_c 28-35$.

8. The blind bolt of claim 7, wherein said first sleeve shank portion has a hardness between $R_c 46-49$.

9. The blind bolt of claim 7, wherein said first sleeve shank portion has a hardness between $R_c 46-49$.

10. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin having an elongated pin shank terminating at one end in an enlarged pin head and at another end having a threaded portion, said pin head including a sleeve engaging surface on an underside thereof, an angle between said sleeve engaging surface and said elongated pin shank being between approximately 88–90°;

a generally elongated tubular sleeve adapted to receive said pin shank, said tubular sleeve including a first sleeve shank portion adapted to be located in the aligned openings in the workpieces and a second sleeve shank portion being located on said pin shank between said pin head and said first sleeve shank portion and arranged to engage said sleeve engaging surface of said pin head, said second sleeve shank portion having a band portion of a predetermined axial length, said band portion having a hardness less than the hardness of the first sleeve shank portion;

a threaded nut for engaging said threaded portion of said pin shank and operatively connected with said tubular sleeve and adapted to be engaged by the installation tool whereby the relative axial force can be applied by the installation tool between said pin and said nut to clamp the workpieces together at a relative axial force of a first magnitude;

said second sleeve shank portion being radially deformable at said band portion between said pin head and the blind side surface of the workpieces in response to the relative axial force of a second magnitude less than said first magnitude to form an enlarged bulbed blind head for reacting against the blind side surface and a sleeve leg section extending between said blind head and said sleeve engaging surface for a preselected length;

a shear washer positioned between said sleeve and said nut on the accessible side of the workpieces for transmitting the relative axial force of said second magnitude to said second sleeve shank portion through said first sleeve shank portion and having a frangible shear section that shears responsive to a third magnitude of relative axial force less than said first magnitude and greater than said second magnitude and moves said first sleeve shank portion out of an axial load bearing relationship with said pin head whereby said blind head will engage the blind side surface such that said first magnitude of relative axial force and the final clamp load applied to the workpieces will be substantially between said pin, said blind head and said nut; and wherein said sleeve leg section expands radially outwardly upon application of the relative axial forces, said preselected length of said sleeve leg section being such that said sleeve leg section expands sufficiently to increase the length of a shear line through said blind head between the workpieces and said pin head to continuously include said preselected length of said sleeve leg section.

11. The blind bolt of claim 10, wherein said shear washer includes one side adapted to be in load bearing relationship with the accessible side surface of the workpieces.

12. The blind bolt of claim 10 wherein said threaded portion of said pin is defined by a helical thread form, said nut having a mating thread form adapted to be threadably engaged with said threaded portion whereby the relative axial force between said pin and said nut is provided by the relative torque applied between said pin and said nut.

13. The blind bolt of claim 11 wherein said pin shank includes a splined end portion adapted to be engaged by the installation tool whereby torque can be applied between said pin and said nut, said splined end portion having a plurality of axially extending pointed splines defined by ridges extending radially from spline roots, said splines being generally uniformly circumferentially distributed with a plurality of said splines located in each quadrant around said end portion, a helical thread form of said threaded portion of said pin extending across said splined end portion with the major and minor diameters of said spline ridges and roots being substantially the same as and compatible with the major and minor diameters of said helical thread form of said threaded portion whereby said nut can be threaded thereacross.

14. The blind bolt of claim 13, wherein the angle between said sleeve engaging surface and said elongated pin shank is approximately 89°.

15. The blind bolt of claim 14, wherein a segment of said band portion has a hardness between $R_c$ 28–35.

16. The blind bolt of claim 15, wherein said first sleeve shank portion has a hardness between $R_c$ 46–49.

17. The blind bolt of claim 10, wherein the angle between said sleeve engaging surface and said elongated pin shank is approximately 89°.

18. The blind bolt of claim 17, wherein a segment of said band portion has a hardness between $R_c$ 28–35.

19. The blind bolt of claim 18, wherein said first sleeve shank portion has a hardness between $R_c$ 46–49.

20. The blind bolt of claim 10, wherein a section of said band portion has a hardness between $R_c$ 28–35.

21. The blind bolt of claim 20, wherein said first sleeve shank portion has a hardness between $R_c$ 46–49.

22. The blind bolt of claim 10, wherein said nut includes a counterbore adjacent said shear washer for receiving said frangible shear section after it shears from said shear washer.

23. The blind bolt of claim 22, wherein said nut counterbore has a depth defining a grip cavity of preselected length generally equal to the grip range of the fastener where the grip range is defined as the difference between the minimum and maximum total thickness of the workpieces that a single fastener can secure together.

24. The blind bolt of claim 10, wherein said shear section of said shear washer includes a reduced thickness portion of said shear washer formed by a counterbore in said shear washer.

25. The blind bolt of claim 10, wherein said shear section of said shear washer includes a reduced thickness portion of said shear washer formed by at least one circular groove on one side of said shear washer.

26. The blind bolt of claim 25, wherein said shear section of said shear washer includes a reduced thickness portion of said shear washer formed by at least one circular groove on each side of said shear washer.

27. The blind bolt of claim 10, wherein the radially outwardly expansion of the outer diameter of said sleeve leg section is between 1.5–5.0%.

28. The blind bolt of claim 10, wherein the radially outwardly expansion of the outer diameter of said sleeve leg section is between 1.8–4.5%.

29. The blind bolt of claim 28, wherein the length of said sleeve leg section above said blind head is between 0.090–0.130".

30. The blind bolt of claim 10, wherein the length of said sleeves leg section after formation of above said blind head is between 0.090–0.130".

31. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head, the pin head including a sleeve engaging surface on an underside thereof, a generally elongated tubular sleeve adapted to receive said pin shank, said tubular sleeve including a first sleeve shank portion adapted to be located in the aligned openings in the workpieces and a second sleeve shank portion being located on said pin shank between said pin head and said first sleeve shank portion and arranged to engage the sleeve engaging surface of the pin head, the second sleeve shank portion having a sleeve leg section with a band portion of a predetermined axial length, the band portion having a hardness less than the hardness of the first sleeve shank portion;

engaging means operatively connected with said tubular sleeve and including an engaging structure adapted to be engaged by the installation tool whereby the relative axial force can be applied by the installation tool between said pin member and said engaging means to clamp the workpieces together at a relative axial force of a first magnitude;

said second sleeve shank portion being radially deformable at the band portion between said pin head and the blind side surface of the workpieces in response to the relative axial force of a second magnitude less than said first magnitude to form an enlarged blind head for reacting against the blind side surface with a segment of said sleeve leg section above the blind head;

a load bearing means for transmitting the relative axial force of said second magnitude to said second sleeve shank portion through said first sleeve shank portion and responsive to a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means;

said load bearing means adapted to be located generally externally of the aligned openings at the accessible side surface of the workpieces; securing means on said pin shank;

said engaging means including an engaging structure operable with said securing means for connecting said pin member and said engaging structure together; and wherein said sleeve leg section expands radially outwardly at said band portion upon application of the relative axial forces sufficiently with said segment of said sleeve leg section increasing the length of a shear line through the blind head, said band portion adapted to fold radially outwardly to form said blind head in a bulb form in response to the relative axial force of said second magnitude, the length of said segment of said sleeve leg section above said blind head being between around 0.090–0.130".

32. The blind bolt of claim 31, wherein the first sleeve shank portion has a hardness between $R_c$46–49 and wherein a portion of the band portion has a hardness between $R_c$28–35.

33. The blind bolt of claim 31 with said pin having an elongated pin shank terminating at one end in an enlarged pin head and at another end having a threaded portion, the pin head including a sleeve engaging surface on an underside thereof, an angle between the sleeve engaging surface and the elongated pin shank being between approximately 88–90°;

a threaded nut for engaging the threaded portion of the pin and operatively connected with said tubular sleeve and adapted to be engaged by the installation tool whereby the relative axial force can be applied by the installation tool between said pin and said nut to clamp the workpieces together at a relative axial force of a first magnitude;

a shear washer positioned between the sleeve and the nut on the accessible side of the workpieces for transmitting the relative axial force of said second magnitude to said second sleeve shank portion through said first sleeve shank portion and having a frangible shear section that shears responsive to a third magnitude of relative axial force less than said first magnitude and greater than said second magnitude and moves the first sleeve shank portion moving out of an axial load bearing relationship with said pin head whereby said blind head will engage the blind side surface such that said first magnitude of relative axial force and the final clamp load applied to the workpieces will be substantially between said pin, said blind head and said nut.

34. The blind bolt of claim 33, wherein said shear washer includes one side adapted to be in load bearing relationship with the accessible side surface of the workpieces, said nut includes a counterbore adjacent the shear washer for receiving the frangible shear section after it shears from the shear washer.

35. The blind bolt of claim 31, wherein the radially outwardly expansion of said band portion of said sleeve leg section is between 1.5–5.0%.

* * * * *

UNITED STATES PATENT AND TRADEMARK OFFICE
CERTIFICATE OF CORRECTION

PATENT NO. : 6,247,883 B1
DATED : June 19, 2001
INVENTOR(S) : Ernest Monserratt

It is certified that error appears in the above-identified patent and that said Letters Patent is hereby corrected as shown below:

<u>Column 4,</u>
Line 55, after "10a" delete "taken in the circle 10c in FIG. 10b".
Line 56, after "10b" insert -- taken in the circle 10c in FIG. 10b --.

<u>Column 8,</u>
Line 60, delete "Actual" and insert -- A pictorial representation of an actual --.

<u>Column 9,</u>
Line 3, after "4b," insert -- a pictorial representation of --.
Line 20, delete "12b" and substitute therefor -- 6b, a pictorial representation of --.

<u>Column 15,</u>
Line 47, delete "11" and substitute therefor -- 10 --.

Signed and Sealed this

Third Day of June, 2003

JAMES E. ROGAN
*Director of the United States Patent and Trademark Office*